Aug. 22, 1967  H. L. ERICKSON  3,337,130
THERMOSTATIC VALVE SYSTEM
Filed Oct. 21, 1966  2 Sheets-Sheet 1
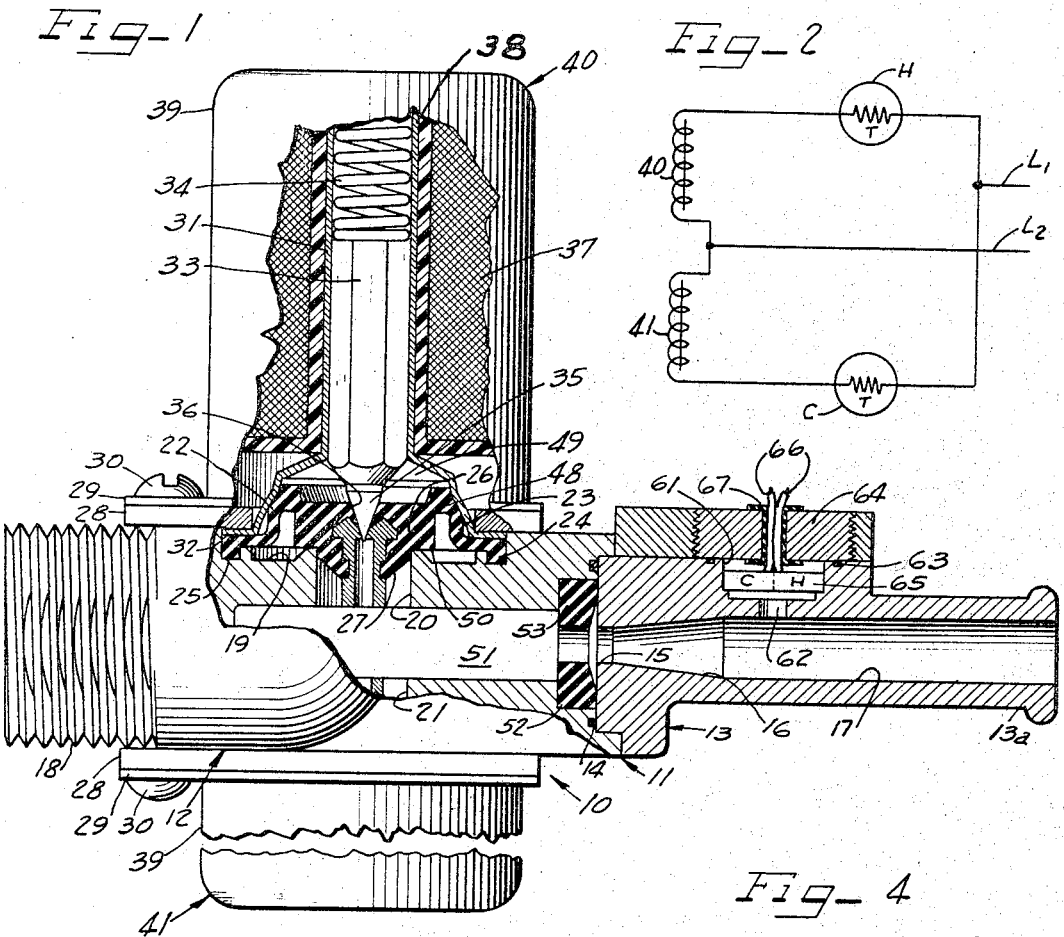
INVENTOR.
HOWARD L. ERICKSON
ATTORNEYS Aug. 22, 1967  H. L. ERICKSON  3,337,130
THERMOSTATIC VALVE SYSTEM
Filed Oct. 21, 1966  2 Sheets-Sheet 2

INVENTOR.
HOWARD L. ERICKSON
BY  ATTORNEYS

United States Patent Office 3,337,130
Patented Aug. 22, 1967

3,337,130
THERMOSTATIC VALVE SYSTEM
Howard L. Erickson, Bensenville, Ill., assignor to The Dole Valve Company, Morton Grove, Ill., a corporation of Illinois
Filed Oct. 21, 1966, Ser. No. 616,137
13 Claims. (Cl. 236—12)

The present application is a continuation-in-part of my co-pending applications, Ser. No. 399,638, filed Sept. 28, 1964, and Ser. No. 417,378, filed Dec. 10, 1964, both abandoned. Therefore I claim a priority filing date of Sept. 28, 1964, for claims 1–7, the claims taken from my application Ser. No. 399,638, and a priority filing date of Dec. 10, 1964, for claims 8–13, the claims taken from my application Ser. No. 417,378.

This invention relates to thermostatic fluid regulator means and more particularly relates to a control valve having electrically actuable valve means for the hot and cold fluid inlets thereto which are energizable through thermal responsive variable resistors disposed in heat transfer relation with water flowing through the valve.

Generally speaking, the instant invention finds application in any environment wherein a valve body is provided with a single outlet and with hot and cold water inlets connected, respectively, to hot and cold water sources and wherein individual electrically actuable valve means are provided for controlling the flow of hot and cold water through the valve.

It is a principal object of the present invention to mount a pair of thermal responsive variable resistors having opposite temperature coefficients of resistance in or on the valve body in heat-transfer relation with water at the outlet or at least on the downstream side of the valves and to connect the thermal responsive variable resistors in circuit with the electrically actuable valves to cause the valves to be actuated as a function of the sensed water temperature.

Another object of the present invention is to provide a thermostatic water control valve which does not require movable mechanical switch actuators to actuate mechanical switches in response to water temperature, thereby greatly eliminating the possibility of a malfunction due to mechanical failure of such actuators or switches.

A more specific object of the invention resides in the provision of a water control valve of the general type referred to above wherein electrically actuable solenoids are employed for controlling operation of the hot and cold shut-off valves and wherein energization of a solenoid will cause its respective valve to be opened and specifically resides in an arrangement wherein the cold water solenoid valve is connected in series with the thermal responsive variable resistor having a negative temperature coefficient of resistance and wherein the thermal responsive variable resistor having a positive temperature coefficient of resistance is connected in series with the hot water solenoid valve.

Still another specific object of the present invention resides in the use of thermal responsive variable resistors as temperature control elements for the solenoid.

A still further and even more specific object of the invention resides in the provision of a valve structure of the type referred to immediately above wherein the thermal responsive variable resistors are encapsulated together within a package which, in turn, is exposed to water flowing through the outlet of the valve body.

These and other objects, advantages and features of the present invention will become apparent from time to time as the following specification proceeds and with reference to the accompanying drawing, wherein:

FIGURE 1 is a partially sectioned side elevational view of a water control valve constructed in accordance with the principles of the present invention;

FIGURE 2 is a schematic wiring diagram for the structure illustrated in FIGURE 1;

FIGURE 3 is a graphic representation of the characteristics of the thermal responsive variable resistors employed in the illustrated valve;

FIGURE 4 is an alternate embodiment of the schematic wiring diagram of FIGURE 2;

Figure 5:
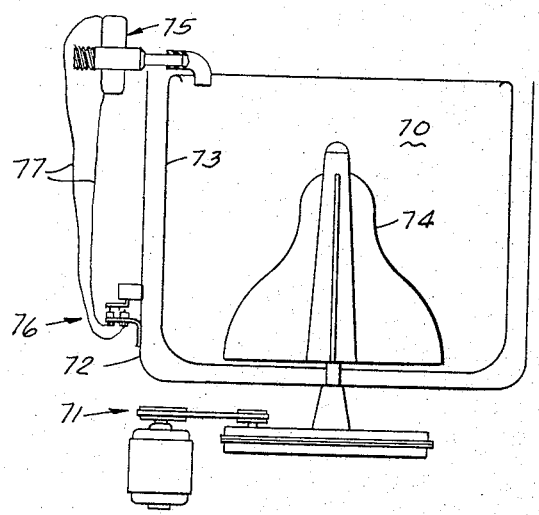
FIGURE 5 is a side elevational view of the location and interrelationship of the elements in accordance with an alternate form of the present invention.

A water control valve assembly 10 comprises a two-part valve body 11 including a chambered inlet block 12 and an outlet block 13 which is secured thereto in a known manner and which terminates in a connecting nipple 13a at the outer or downstream ends thereof. A sealing ring 14 is interposed between the blocks 12 and 13 to provide a fluid-tight seal therebetween.

A small diameter port 15 opens from the upstream end of the outlet block 13 through a diverging wall section 16 to a cylindrical outlet passage 17. The flow passageway thus formed through the outlet block 15 provides an unimpeded flow path for fluid traveling through the valve. A hot water inlet nipple 18 is formed integrally with the inlet block 12 and has an identical cold water inlet positioned adjacent to it which cannot be seen in the drawing. The hot water inlet nipple has a passageway formed therein which is communicable with an annular trough 19 surrounding a vertical flow port 20 formed within the block 12. In a like manner, the cold water inlet nipple has a passageway formed therethrough which is communicable with an annular trough formed on the opposite side of the block 12 and surrounding a vertical flow port 21 which is coaxial with the flow port 20.

Identical fluid pressure actuated diaphragm valve members 22 are cooperable with the ports 20 and 21 to control the flow of hot and cold fluids therethrough.

Diaphragm valves 22 comprise relatively thin resilient membranes 23 having peripheral beads 24 formed therearound and seated within bead grooves 25 formed in the inlet block 12 around the shallow troughs 19. Each membrane 23 has a central thickened portion 26 which constitutes the valve head and from which depends in a downwardly converging direction a conical section 27 which is adapted to be positioned within its respective vertical flow port 20 or 21.

The peripheral bead 24 is maintained in a clamped sealed position in the beaded groove 25 by a bracket 28 and solenoid cover 29 which are sandwiched together and screwed into the inlet block 12 by screws 30 extending therethrough.

As is well known in the art of valve manufacture, armature guide 31 is positioned over the diaphragm valve 22 coaxially thereof and has an upturned flange 32 at its lower end clamped between the peripheral edge of the diaphragm valve member 22 and the bracket 28. The guide 31 is closed at its upper end and has an armature 33 (octagonal in horizontal cross section) slidably guided therein. A compression spring 34 is interposed between the uppermost end of the armature guide 31 and the armature 33 to bias the pointed valve head 35 at the lowermost end of the armature 33 into a seated position in a central flow port 36 formed in the diaphragm valve member 22. A solenoid coil 37 is wound on a bobbin 38 which, in turn, is fitted over the guide 31 and the entire assembly is encased within the solenoid cover 39.

As is well understood by those skilled in the valve art, the diaphragm valve 22 has a bleed port or ports 48 formed therein, the total combined flow area of which is less than the flow area of the central enlarged port 36 so that upon movement of the armature 33 to a retracted position caused by energization of the electrical coil 37, water will pass from the chamber 49 formed above the diaphragm valve member 22 to and through the central port 36 to the downstream side of the valve member faster than fluid will flow through the bleed ports 48 and the net force acting across the diaphragm valve member will be an upward one so that the central thicker portion 26 of the valve member will be unseated from the annular seat 50 formed about the port 20 by the differential in fluid pressure acting across the valve.

It will be understood that the bleed port or ports 48 are formed radially outwardly of the central port 36 and that when the diaphragm valve member 22 is in an unseated position, there will be a low pressure area or vortex created immediately over the area of the flow port 20 so that upon seating of the armature valve 35 the pressure of fluid above the diaphragm valve member will be relatively great because of the fact that it is communicated to the chamber 49 through the bleed ports 48 which overlie a relatively high pressure area below the valve and the net force across the valve will be a downward one, thereby causing the diaphragm valve member 22 to be seated once again. Fluid flowing through the ports 20 and 21 travels directly into the mixing chamber 51 and then passes through a resilient annular flow control member 52 seated within an enlarged bore 53 before passing to and through the outlet passageway 17.

Thermal responsive variable resistance devices have become so well known in the art that no detailed description of them is deemed necessary here other than to say that their electrical resistance varies in accordance with temperatures ambient the devices so that they can be effectively employed to control the flow of electrical current in accordance with ambient temperature.

As will soon be explained these thermal responsive variable resistance devices are employed in my invention in a valve operation control capacity and to this end in one embodiment at least, are connected in series with the solenoids which, in turn, control opening and closing of the hot and cold water valves and are themselves exposed to the mixed water on the outlet side of the valves.

Referring to the curves illustrated in FIGURE 3, it will be observed that the thermal responsive variable resistor having a negative temperature coefficient of resistance (sometimes called a thermistor) has a sufficiently small resistance at a temperature of approximately 90° to cause the cold water solenoid connected in circuit therewith to be energized to a "valve open" condition and that the curve for the device having a positive coefficient of resistance (sometimes called a sensistor) which is connected in series with the hot water valve passes through its upper solenoid-operating limit at a temperature of approximately 110° F. It will, therefore, be observed from the curves shown that both solenoids will be actuated and both valves will, therefore, be open when the temperatures ambient the thermal responsive variable resistors are somewhere in the range of 90° to 110°. At temperatures below 90° only the hot water valve solenoid will be energized and at temperatures above 110° only the cold water solenoid will be energized.

According to the embodiment of the invention shown in FIGURE 2, the cold and hot water solenoid connected thermal responsive variable resistors C and H, respectively, are connected in series with the cold and hot water solenoids 41 and 40. Such an arrangement requires a minimum number of components for proper operation of the solenoid valves.

The thermal responsive variable resistors C and H can be placed in the cavity defined by the wall 61 without the use of encapsulating material and in the form of separate sensing elements. It may, however, be preferable to encapsulate the thermal responsive variable resistors H and C within a capsule 65 formed of a thin plastic material or other protective covering which capsule will be effective to protect the thermal responsive variable resistors from direct exposure to the water and yet which will be effective to transmit heat through its walls. The capsule 65 is contained within a wall 61 which is communicable through a passage 62 with the outlet passageway 17. The well 61 is somewhat deeper than the thickness of the capsules so that fluid is free to travel around the undersurface of them. A seal 63 is compressed on a shoulder surrounding the well 61 by a cap 64 which is screw-threaded onto the valve body and which closes the well 61.

Lead wires 66 run from the thermal responsive variable resistors to the solenoid coils and run through a resilient grommet 67 which is fitted within the cap 64 and which serves to prevent the passage of water through the cap.

Obviously, the thermal responsive variable resistors could be placed directly in the outlet flow passageway 17 if desired but it is generally felt more preferable to place these members within the well 61 inasmuch as the flow of water through the valve is not thereby impeded.

Shown in FIGURE 4 is an alternate embodiment of the present invention, wherein both thermal responsive variable resistors C′ and H′ are of the thermistor type, having a negative temperature coefficient of resistance. A thermistor H′ shunts the coil of solenoid 40, while also forming a voltage divider network with a resistor 69 which is in series therewith. During normal operation, the solenoids 40 and 41 will both remain energized allowing fluid of a predetermined temperature to flow through the passageway 17. Should the water temperature increase, the resistance value of the thermistor H′ decreases a sufficient amount to cause a substantial amount of the voltage between lines $L_1$ and $L_2$ to be developed across the resistor 69, thereby decreasing the voltage applied across the parallel circuit of solenoid 40 and thermistor H′ to de-energize the solenoid 40.

However, when the temperature of the fluid decreases, the resistance value of the thermistor H′ will again increase to a sufficient degree to cause a substantial amount of the voltage between lines $L_1$ and $L_2$ to be developed across the paralleled circuit of solenoid 40 and thermistor H′ to energize the solenoid 40. Also the thermistor C′ will increase its resistance to impede the current flow through the solenoid 41 thereby de-energizing the solenoid 41.

In an alternate embodiment of FIGURE 4 both negative coefficient thermistors can be replaced with positive temperature coefficient of resistance devices; however, in so doing, the cold fluid solenoid 41 must be shunted with one variable resistance device while the hot fluid solenoid 40 is in series with the other.

Figure 6:
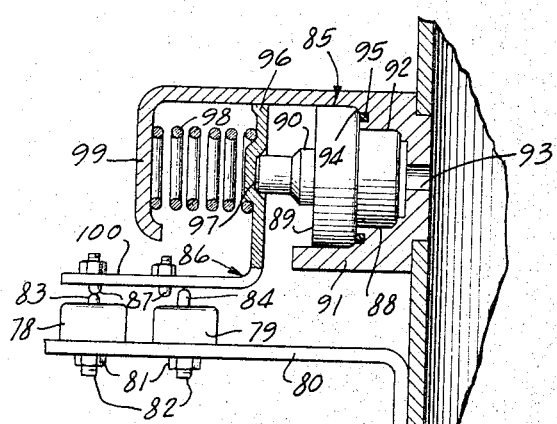
FIGURE 6 is a partially sectioned side elevational view of a temperature sensitive actuating unit constructed in accordance with the present invention.
Figure 7:
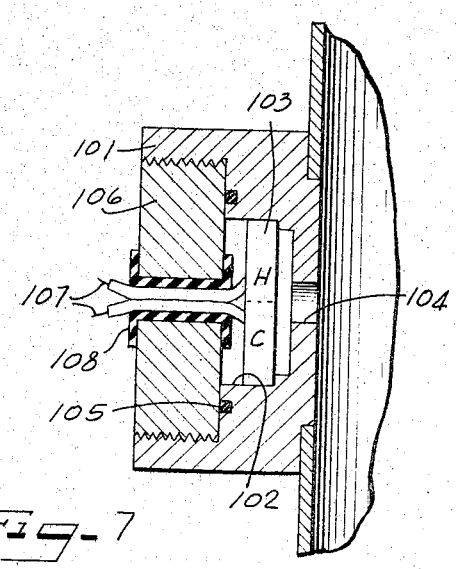
FIGURE 7 is a partially sectioned side elevational view of another embodiment of a temperature sensitive actuating unit.

Two illustrative alternate embodiments of the present invention are illustrated in FIGURES 5, 6 and 7.

In FIGURE 5 is shown a well known arrangement of the principal agitating components of a washing machine 70 including an agitator driver, an outer tub 72, an inner basket 73, and an agitator 74. As in the usual arrangement the tub 72 is used to collect and hold water which is allowed to enter into the inner basket 73 through a series of holes or perforations (not shown in the drawings) in the basket 73. The agitator 74 is used to agitate or put in motion clothes which are held within the basket 73.

A fluid control valve assembly 75 is provided to mix hot and cold water and to control the flow of water into tub 72. A temperature sensitive actuating unit 76 is mounted on the tub 72, so as to be in heat transfer relationship with the water in the tub. As will be described in more detail later, the temperature sensitive actuating unit 76, which may be of the thermal-mechanical type, or of the electrical type, is used to sense the temperature of water within the tub 72 and via the electrical connecting leads 77 to properly actuate the fluid control valve assembly 75.

By placing the temperature sensitive device 15 in heat transfer relationship with the tub itself, less rapid variations in temperature will be sensed due to the larger quantity of water in the tub and fewer oscillations in the operation of hot and cold water valves can be expected.

In one embodiment of the present invention shown in FIGURE 6, the hot-water solenoid assembly and the cold-water solenoid assembly are energized under the control of a pair of electrical switches 78 and 79, respectively, which are secured to bracket 80 by means of fasteners 81 which are threaded on the protruding ends of screws 82 extending through the bracket 80 from each of the switches. The bracket 80 may be welded or otherwise secured to the tub 72. The switches 78 and 79 are each normally closed switches, which are respectively connected in circuit with the electrical coils in the solenoid assemblies. The switches have actuating plungers 83 and 84, which when depressed will move the contact member to an open circuit position and thus effect de-energization of the electrical coil connected therewith and cause the armature of that coil to be moved to a diaphragm valve seated position as is shown in FIGURE 1.

To actuate the solenoid assembly in accordance with the temperature of water in the chamber, there is shown in FIGURE 6 generally, a thermal mechanical transducer unit 85 and a bracket 86 joining a pair of switch actuators 87, which bracket is moved by the thermal mechanical transducer unit 85 in direct response to the temperature of water in the tub 72.

The thermal mechanical transducer unit 85 is of the well known solid fill type and includes a temperature sensing portion 88 containing a micro-crystalline wax or the like which is fusible and expandible upon increases in temperature ambient the sensing portion, an enlarged collar 89, a power member guide 90, and a piston or power member (not shown on the drawings), which is guided for slidable movement within the power member 90, and which is extensible therefrom upon expansion of the wax occasioned by increases in temperature ambient the sensing portion 88. A transducer unit 85 is mounted within a mounting block 91 which may be welded or otherwise rigidly connected to the tub. Transducer 85 has a temperature sensing portion 88 disposed within a well 92 formed in the mounting block 91 and communicable through a passage 93 with the water in the tub 72. The collar 89 seats upon an annular shoulder 94 and compresses a sealing ring 95, which is carried within a groove formed within the shoulder to provide a fluid tight seal between the mounting block 91 and the transducer unit 85. The well 92 is somewhat deeper than the depth of the sensing portion 88, so that fluid is free to travel around the undersurface of the sensing portion. If desired, the unit could be mounted within the mounting block so that the fluid would be free to travel entirely around both the bottom and the side walls of the sensing unit 88, but this, of course, would be dictated by the response and special requirements which have to be met.

The bracket 86 has a vertically extending portion 96 which is dished as at 97 to provide for proper seating of the bracket on the guide 90 and to provide for proper centering of a compression spring 98. The compression spring 98 is interposed between the vertically extending portion 96 of the bracket 86 and a leg 99 of mounting block 91, which extends around and over the transducer unit 85. The spring 98 serves to seat the bracket 86 in position thereof. The bracket 86 has switch actuators or cams 87 mounted on a horizontal portion 100 thereof, and these actuators are cooperable respectively with the switch plungers 83 and 84 to effect their depression.

It will be understood from the details shown in FIGURE 6 that the spacing between the uppermost and lowermost actuating surfaces of the actuators is such that one of the two plungers 83 or 84 is at all times in an extended condition irrespective of the position of the bracket 86.

Assume that both the hot and cold diaphragm valves are initially in an open position, the temperature of the mixed water passing from the mixing chamber 51 to the outlet passageway 17 and thence to the tub 72 begins to increase. The power member within the transducer unit 85 will begin to move extensively because of an increase in temperature ambient the sensing portion 88. Such extensible movement of the power member could move the actuating element 87 into engagement with the plunger 83 to effect depression thereof and open that switch to de-energize the electrical coil of the valve. Upon de-energization of the coil, the valve member will be seated such that the flow of hot water to the mixing chamber 51 will be stopped. Only cold water will then be fed through the valve to the tub 72.

Upon the addition of a sufficient amount of cold water to the tub, the power member will be moved retractably by the spring 98, and when the plunger 83 is again permitted to move to its extended position, the hot water solenoid will again be energized and mixed water will then flow through the valve. As the temperature of the mixed water continues to get colder, the power member within the transducer unit 85 will move retractable to an extent such that depression of plunger 84 will take place. At that time cold water flow through the valve will be cut off and the opposite action will take place.

It will be understood that in referring to FIGURE 1 in connection with FIGURE 6, it is understood that the sensing unit 65 is not employed in that mechanism, but is replaced with the sensing unit mounted in heat transfer relationship with the tub 72. The same remark is applicable to FIGURE 7 in connection with FIGURE 1.

The second embodiment of the present invention employing thermal responsive variable resistance devices is shown in FIGURE 7. These variable resistance devices are of the well known type and, suffice it to say, that their electrical resistance varies in accordance with temperatures ambient to the devices, so that they can be effectively employed to control the flow of electrical current in accordance with ambient temperature. The thermal responsive variable resistor devices are employed in my invention in a valve operation control capacity, and in one form are connected in series with the solenoids which, in turn, control opening and closing of the hot and cold water valves and are themselves exposed to the mixed water in the tub 72.

In this embodiment, thermal responsive variable resistors having characteristics as shown in FIGURE 3, may replace and perform the same functions as the electrical switches 78 and 79 shown in FIGURE 6. These thermal responsive variable resistors would then be connected respectively in series with the cold and hot water solenoids. Such an arrangement requires a minimum number of components for proper operation of the solenoid valves.

FIGURE 7 illustrates in detail the mounting of the thermal responsive variable resistors C and H necessary for placing these elements in heat transfer relation with the water in tub 72. The support block 101 may be welded or otherwise securely fastened to the tub. Thermal responsive variable resistors C and H can be placed in the cavity of the block 101 defined by the well 102 without the use of encapsulating material and in the form of separate sensing elements. It may, however, be preferable to encapsulate the thermal responsive variable resistors C and H within a capsule 103 formed of a thin plastic material or other protective covering, which capsule will be effective to protect the thermal responsive variable resistors from direct exposure to the water, and yet which will be effective to transmit heat through its walls. The capsule 103 is contained within a well 102 which is communicable through a passage 104 with the water contained in tub 72. The well 102 is somewhat deeper than the thickness of the capsule, so that water is free to travel around the undersurface of the capsule. A seal 105 is compressed upon a shoulder surrounding the well 102 by a cap 106 which is screw threaded onto the support block 101 and which closes the well 102. Lead wires 107 run from the thermal responsive variable resistors to the solenoid coils through a resilient grommet 108, which is fitted within the cap 106, and serves to provide the passage of water through the cap.

Obviously, the thermal responsive variable resistors could be placed directly in the tubs 72, if desired, by utilizing suitable means to mount the resistors in such a fashion.

It will be understood that these embodiments of my invention have been used for illustrative purposes only and that various modifications and variations in this invention may be effected without departing from the spirit and scope of the novel concepts thereof.

I claim as my invention:

1. A thermostatic fluid control valve comprising:
   a valve body having hot and cold fluid inlet passageways,
   an outlet in communication with said passageways,
   electrically actuable valve means in at least one of said passageways for controlling fluid flow therethrough, and
   a thermal responsive variable resistor electrically connected in series with said electrically actuable valve means and positioned in heat transfer relation with the fluid within the said outlet.

2. A thermostatic fluid control valve comprising:
   a valve body having hot and cold fluid inlet passageways,
   an outlet in communication with said passageways,
   a first electrically actuable valve means in said hot inlet passageway,
   a second electrically actuable valve means in said cold inlet passageway,
   thermal responsive variable resistors having positive and negative temperature coefficients of resistance electrically connected in series with said first and second electrically actuable valve means, respectively, and
   means mounting said resistors in hear transfer relation to the fluid within said outlet.

3. A thermostatic fluid control valve comprising:
   a valve body having hot and cold fluid inlet passageways,
   an outlet in communication with said passageways,
   a first electrically actuable valve means in said hot inlet passageway,
   a second electrically actuable valve means in said cold inlet passageway,
   thermal responsive variable resistors having positive and negative temperature coefficients of resistance electrically connected in series with said first and said second electrically actuable valve means, respectively,
   means mounting said resistors in heat transfer relation to the fluid within said outlet,
   a cavity formed within said body,
   means communicating said cavity with said outlet whereby some of the fluid passing through said outlet will circulate to and through said passage, and
   means mounting said resistors within said cavity in heat transfer relation to the fluid therein.

4. A thermostatic fluid control valve of the character recited in claim 3 wherein said resistors are enveloped by a thin protective encapsulation material.

5. Fluid flow regulator means having hot and cold fluid input passageways and a fluid outlet passageway,
   first electrically energizable means in said hot fluid input passageway for controlling the flow of fluid therethrough,
   second electrically energizable means in said cold fluid input passageway for controlling the flow of fluid therethrough,
   a first thermal responsive variable resistor device in circuit with said first electrically energizable means for de-energizing said first electrically energizable means when exposed to a predetermined high ambient temperature,
   a second thermal responsive variable resistor device in circuit with said second electrically energizable means for de-energizing said second electrically energizable means when exposed to a predetermined relatively lower ambient fluid temperature, and means positioning said devices in heat transfer relation with the fluid within said fluid outlet passageway.

6. Fluid flow regulator means having hot and cold fluid input passageways and a fluid outlet passageway,
   first electrically energizable valve means in said hot fluid input passageway for controlling the flow of fluid therethrough,
   second electrically energizable valve means in said cold fluid input passageway for controlling the flow of fluid therethrough,
   said hot and cold fluids from said hot fluid input passageway and cold fluid input passageway being mixed at said outlet passageway to form a fluid of intermediate temperature,
   a first thermal responsive variable resistor exposed to fluid passing through said outlet passageway and connected in circuit with said first electrically enerizable valve means for de-energizing said first electrically energizable valve means when the fluid temperature at said outlet passageway rises above said intermediate temperature, and
   a second thermal responsive variable resistor also exposed to fluid passing through said outlet passageway and connected in circuit with said second electrically energizable valve means for de-energizing said second electrically energizable valve means when the fluid temperature from said outlet passageway decreases to a point below said intermediate temperature.

7. A fluid flow regulator as recited in claim 6 wherein said resistors are mounted within a cavity formed in said valve body opening to said outlet passageway.

8. In combination in a washing machine having a tub and having a fluid control valve for controlling the flow of temperature mixed water to the tub, said fluid control valve having a valve body with hot and cold fluid inlet passageways, an outlet communicating said passageways with said tub, and electrically actuable valve means in at least one of said passageways for controlling the fluid flow therethrough, the improvement of means for controlling operation of said fluid control valve in accordance with the temperature of water within said tub comprising:
   a thermal responsive variable resistor electrically connected in series with said electrically actuable valve means and positioned in heat transfer relation with the fluid within said tub.

9. In combination in a washing machine having a tub and having a fluid control valve for controlling the flow of temperature mixed water to the tub, said fluid control valve having a valve body with hot and cold fluid inlet passageways, an outlet communicating said passageways with said tub, a first electrically actuable valve means in said hot inlet passageway, and a second electrically actuable valve means in said cold inlet passageway, the improvement of means for controlling operation of said fluid control valve in accordance with the temperature of water within said tub comprising:
   thermal responsive variable resistors having positive and negative temperature co-efficients of resistance electrically connected in series with said first and second electrically actuable valve means, respectively, and means to mount said resistors in heat transfer relation to the fluid within said tub.

10. The combination comprising:

a reservoir, a first valve means for controlling the flow of hot fluid to the reservoir, first electrical actuator means associated with the first valve means for opening and closing the same, a second valve means for controlling the flow of cold fluid to the reservoir, second electrical actuator means associated with the second valve means for opening and closing the same, a first electrical circuit having said first actuator means and a first thermal resistor operably connected therein such that the flow of current through said first actuator is dependent upon the resistance of said first thermal resistor, a second electrical circuit having said second actuator means and a second thermal resistor operably connected therein such that the flow of current through said second actuator is dependent upon the resistance of said second resistor, said first and second thermal resistors being disposed in heat conduction relationship with the fluid in said reservoir, said first thermal resistor being connected in said first circuit to decrease the flow of current through said first actuator upon a rise in temperature ambient said first thermal resistor, and said second thermal resistor being connected in said second circuit to decrease the flow of current through said second actuator upon a fall in temperature ambient said second thermal resistor.

11. The combination comprising:

a reservoir, a first valve means for controlling the flow of hot fluid to the reservoir, first electrical actuator means associated with the first valve means for opening and closing the same, a second valve means for controlling the flow of cold fluid to the reservoir, second electrical actuator means associated with the second valve means for opening and closing the same, a first electrical circuit having said first actuator means and a positive coefficient thermal resistor operably connected in series with said first actuator means, a second electrical circuit having said second actuator means and a negative coefficient thermal resistor operably connected in series with said second actuator means, and said positive and negative coefficient thermal resistors being disposed in heat conduction relationship with the fluid in said reservoir.

12. The combination in accordance with claim 10 wherein said thermal resistors and respective actuator means are chosen to have conductive values such that the turn off temperature of said cold fluid valve is less than the turn off temperature of said hot fluid valve whereby three operation stages are provided, namely, the cold on, hot off; hot on-cold off; and cold on, hot on stages.

13. The combination comprising:

a reservoir, a first valve means for controlling the flow of hot fluid to the reservoir, first electrical actuator means associated with the first valve means for opening and closing the same, a second valve means for controlling the flow of cold fluid to the reservoir, second electrical actuator means associated with the second valve means for opening and closing the same, a first electrical circuit having said first actuator means and a positive coefficient thermal resistor operably connected in series with said first actuator means, a second electrical circuit having said second actuator means and a negative coefficient thermal resistor operably connected in series with said second actuator means, said positive and negative cofficient thermal resistors being disposed in heat conduction relationship with the fluid in said reservoir, said first and second circuits being energized by a substantially equal magnitude voltage source, said positive and negative coefficient thermal resistors having substantially equal turn off resistance values and having equal resistance values at a temperature intermediate the low and high temperatures corresponding to the turn off resistances.

References Cited
UNITED STATES PATENTS

| | | | |
|---|---|---|---|
| 1,103,756 | 7/1914 | Gebhardt | 236—12 |
| 2,019,058 | 10/1935 | Rippe. | |
| 2,118,248 | 5/1938 | Keinath | 236—84 |
| 2,280,667 | 4/1942 | Scott et al. | |
| 2,339,635 | 1/1944 | Hall. | |
| 2,451,459 | 10/1948 | Williams. | |
| 2,619,284 | 11/1952 | Maddock-Clegg et al. | 236—12 |
| 2,844,320 | 7/1958 | Cate | 236—12 |
| 2,978,181 | 4/1961 | Noakes | 236—12 |
| 3,003,700 | 10/1961 | Joesting | 236—84 |
| 3,050,865 | 8/1962 | Morey. | |
| 3,207,435 | 9/1965 | Erickson et al. | 236—12 |

EDWARD J. MICHAEL, *Primary Examiner.*